United States Patent [19]

Sobajima et al.

[11] Patent Number: 5,296,186
[45] Date of Patent: Mar. 22, 1994

[54] PROCESS FOR PRODUCING MOLDED PRODUCTS OF PROPYLENE RESIN

[75] Inventors: Yoshihiro Sobajima; Masahide Hamaura; Itsushi Imamura, all of Yokkaichi, Japan

[73] Assignee: Mitsubishi Petrochemical Company Limited, Tokyo, Japan

[21] Appl. No.: 17,377

[22] Filed: Feb. 12, 1993

[30] Foreign Application Priority Data

Feb. 13, 1992 [JP] Japan .................................. 4-026930

[51] Int. Cl.$^5$ .......................... B29B 7/48; B29C 45/03
[52] U.S. Cl. ............................. 264/211.23; 264/210.6; 264/328.1; 264/331.17; 264/349; 264/331.18; 524/584; 525/240
[58] Field of Search ........... 264/211.23, 328.1, 331.17, 264/349, 210.6, 331.18; 524/584; 525/74, 240

[56] References Cited

U.S. PATENT DOCUMENTS

| | | | |
|---|---|---|---|
| 4,003,874 | 1/1977 | Ide et al. | 524/584 |
| 4,997,875 | 3/1991 | Geddes et al. | 525/64 |
| 5,013,771 | 5/1991 | Guillet et al. | 524/584 |

*Primary Examiner*—Jeffery Thurlow
*Assistant Examiner*—Mathieu Vargot
*Attorney, Agent, or Firm*—Oblon, Spivak, McClelland, Maier & Neustadt

[57] ABSTRACT

A process for producing a molded product of propylene resin which includes melting and kneading at least a part of the following component (a), adding to the resulting melt the following component (b) or the component (b) and the remainder of the component (a) and kneading the resulting mixture to prepare a resin composition having a melt flow rate of 1 to 100 g/10 min, and then molding the resin composition into a molded product in which the breakage rate of the component (b) is 30% by weight or less: (a) 100 parts by weight of a crystalline propylene polymer having a melt flow rate of 1 to 300 g/10 min and (b) 3 to 80 parts by weight of a filler in the form of hollow particles having a mean particle density (true density) of 0.1 to 0.9 g/cm$^3$, as measured according to ASTM-D2840, a mean particle diameter of 7 to 100 μm and a 10%-by-weight breakage pressure resistance of 100 kg/cm$^2$ or more, as measured according to ASTM-D3102.

17 Claims, No Drawings

PROCESS FOR PRODUCING MOLDED PRODUCTS OF PROPYLENE RESIN

BACKGROUND OF THE INVENTION

1. Field of the Invention

This invention relates to a process for producing molded products of propylene resin which are light in weight and excellent in strength, and are suitably used in the fields of industrial parts, especially, automotive parts, domestic electrical appliance parts and containers, packages or the like.

2. Background Art

So far, propylene resins, especially because of their excellent mechanical strength and processibility, have been widely used in the fields of industrial parts such as automotive parts.

Especially for those industrial parts which are required to have high rigidity and heat resistance, propylene resins have been used in composite with inorganic fillers such as glass fibers. Such propylene resin compositions have been practically used for automotive parts, more specifically, interior trim parts such as trims and instrument panels, exterior trim parts such as bumpers and functional trim parts such as fan shrouds.

A problem with the conventional propylene resin compositions is that since the compositions used are in composite with large amounts of inorganic fillers such as talc or glass fibers, which are much higher in density than propylene polymers, their own densities become too large, thus providing molded products of too much weight. In order to overcome this problem, molded products made from propylene resin compositions filled with light-weight fillers having a very low true density have been proposed in the art. Among others, particular interest is given to injection-molded products made from propylene resin compositions filled with fillers in the form of hollow particles.

For instance, Japanese Patent Laid-Open Publication No. 51-82367 teaches the technique of foam molding hollow filler-containing resins by injection molding.

Japanese Patent Laid-Open Publication No. 1-294751 has proposed to use propylene polymer compositions containing fillers in the form of hollow particles having a very high pressure resistance.

However, the propylene resin compositions with such fillers in the form of hollow particles, e.g., hollow glass spheres, have the drawback that the hollow particles are likely to be broken during kneading and molding processes whereby it is difficult to attain considerable reduction in weight of mold products, especially injection-molded products.

It is therefore a primary object of the present invention to provide a process for producing molded products of propylene resin compositions containing fillers in the form of hollow particles, which effectively prevents the hollow particles from being broken during molding processes and can provide molded products light in weight and excellent in strength.

SUMMARY OF THE INVENTION

It has now been found that the above object can be attained, according to the present invention, by a process for producing a molded product of propylene resin which comprises melting and kneading at least a part of the following component (a), adding to the resulting melt the following component (b) or the component (b) and the remainder of the component (a) and kneading the resulting mixture to prepare a resin composition having a melt flow rate of 1 to 100 g/10 min, and then molding the resin composition into a molded product in which the breakage rate of the component (b) is 30% by weight or less:

(a) 100 parts by weight of a crystalline propylene polymer having a melt flow rate of 1 to 300 g/10 min and (b) 3 to 80 parts by weight of a filler in the form of hollow particles having a mean particle density (true density) of 0.1 to 0.9 g/cm$^3$, as measured according to ASTM-D2840, a mean particle diameter of 7 to 100 μm and a 10%-by-weight breakage pressure resistance of 100 kg/cm$^2$ or more, as measured according to ASTM-D3102.

DETAILED DESCRIPTION OF THE INVENTION

[I] Production of Propylene Resin Compositions

(1) Starting Components (a) Propylene Polymer—Component (a)

For the crystalline propylene polymers used as the component (a) in the invention, use may be made of homopolymers of propylene (polypropylene) and at least binary block, random or graft copolymers of a major amount of propylene with minor amounts of other α-olefins (e.g., ethylene, butene, pentene, hexene, heptene, 4-methylpentene and octene), vinyl esters (e.g., vinyl acetate), aromatic vinyl monomers (e.g., styrene), vinylsilanes (e.g., vinyltrimethoxysilane and vinyltrimethylsilane), unsaturated organic acids or their derivatives (e.g., acrylic acid and maleic anhydride) and the like, all of which have an overall MFR of 1 to 300 g/10 min.

Among others, preference is given to a propylene/ethylene block copolymer having an overall MFR of 2 to 100 g/10 min and, in view of strength, particular preference is given to the copolymer containing a propylene homopolymer moiety having a density of 0.9070 g/cm$^3$ or higher and a random copolymer moiety that accounts for 3 to 40% by weight thereof. Most preferably, said copolymer should be at least partly modified by an unsaturated organic acid or its derivative such as acrylic acid or maleic anhydride.

The propylene polymers having too small an overall MFR are unsuitable because of their poor moldability, and those having too large an overall MFR are again unsuitable because of their poor impact strength.

The propylene polymers used in the invention may be prepared by slurry, gas-phase or liquid-phase bulk polymerization with the use of stereospecific polymerization catalysts. Examples of the stereospecific polymerization catalysts include a combination of a solid catalyst component obtained by bringing titanium tetrachloride, an organic acid halide and an organosilicon compound into contact with magnesium chloride with an organoaluminum compound.

In order to obtain propylene polymers modified with unsaturated organic acids or their derivatives, an unsaturated organic acid such as acrylic, methacrylic, maleic or itaconic acid; an unsaturated organic acid anhydride such as anhydrous maleic, itaconic or citraconic acid; an ester of an unsaturated organic acid such as methyl acrylate or monomethyl maleate; an amide of an unsaturated organic acid such as acrylamide or fumaric acid monoamide; or an imide of an unsaturated organic acid such as itaconic acid imide may be added to the propylene polymer in an amount of 0.01 to 20 parts by weight per 100 parts by weight of propylene polymer under graft reaction conditions.

Among others, the propylene polymer is preferably modified with acrylic acid or maleic anhydride. For the modification, organic peroxides such as benzoyl peroxide and dicumyl peroxide are used so as to promote the degree of modification. The modification of polypropylene may be achieved, for example, by kneading the propylene polymer with the above unsaturated organic acid or its derivative in their molten state at a temperature higher than the melting point of propylene polymer or by allowing the propylene polymer to react with the modifier in a solution. For use, the thus modified polymer may be diluted at any desired concentration with an unmodified propylene polymer.

(b) Filler in the Form of Hollow Particles—Component (b)

The filler in the form of hollow particles used as the component (b) in the invention has a mean particle density (true density) of 0.1 to 0.9 g/cm$^3$, as measured according to ASTM-D2840 (using an air comparison pycnometer); a mean particle diameter of 7 to 100 $\mu$m, as measured with a laser scattering light type size distribution meter; and a 10%-by-weight breakage pressure resistance of 100 kg/cm$^2$ or more, as measured according to ASTM-D3102 (using glycerol). Such fillers may include glass balloons, shirasu balloons, aluminum silicate balloons (ceramic balloons) and polymer balloons such as of an acrylate-styrene type. In particular, preference is given to ceramic and glass balloons, and the most preference is given to glass balloons.

The use of a filler having a mean particle density (true density) less than the lower limit of the above range, a mean diameter exceeding the upper limit of the above range or a 10%-by-weight breakage pressure resistance less than the lower limit of the above range is not preferred, because the hollow particles are likely to break down during molding or kneading, thus providing molded products with the breakage rate of filler exceeding 30%. The use of a filler having a mean particle density (true density) exceeding the upper limit of the above range or a mean diameter less than the lower limit of the above range is again not preferred, because no sufficient effect is obtained on weight reduction.

The breakage rate of filler in molded products may be determined, for example, from the density of molded products or by microscopical observation, and the mean diameter of filler may be measured with a size distribution meter, e.g., LA-500 made by Horiba Seisakusho.

It is preferred to use a filler having a mean particle density (true density) of 0.2 to 0.7 g/cm$^3$, a mean diameter of 10 to 90 $\mu$m and a 10%-by-weight breakage pressure resistance of 120 kg/cm$^2$ or more, especially a filler having a mean particle density (true density) of 0.2 to 0.6 g/cm$^3$, a mean diameter of 10 to 60 $\mu$m and a 10%-by-weight breakage pressure resistance of 150 kg/cm$^2$ or more.

More preferably, substantially all particles of such fillers have a diameter of less than 120 $\mu$m.

The fillers should preferably be treated on the surface with various coupling agents such as those based on silanes or titanates, because this makes the filler hard to break down and provides molded products with increased impact strength, heat resistance and rigidity.

Usually, the coupling agent is preferably used in an amount of 3% by weight or less of the filler. In particular, the filler is preferably treated with less than 1% by weight of a silane coupling agent such as epoxysilane or aminosilane, esp., less than 1% by weight of an aminosilane coupling agent.

Particularly preferable for the filler are glass balloons treated with the coupling agent.

Among others, preferably used are glass balloons which have a mean particle density (true density) of 0.1 to 0.8 g/cm$^3$, a mean diameter of 7 to 100 $\mu$m and a mean 10%-by-weight breakage pressure resistance of 150 kg/cm$^2$ or more and which are treated on their surfaces with the coupling agent. Such glass balloons are very unlikely to break down during kneading or molding, and thus provide molded products with the breakage rate of filler reduced to 25% by weight or less. The more preference is given to using the coupling-treated glass balloons having a mean particle density (true density) of 0.2 to 0.7 g/cm$^3$, a mean diameter of 10 to 90 $\mu$m and a mean 10%-by-weight breakage pressure resistance of 200 kg/cm$^2$ or more, especially those having a mean particle density (true density) of 0.2 to 0.6 g/cm$^3$, a mean diameter of 10 to 60 $\mu$m and a mean 10%-by-weight breakage pressure resistance of 250 kg/cm$^2$ or more.

The molded product of the present invention contain the component (b) in an amount of 3 to 80 parts by weight, preferably 5 to 70 parts by weight, more preferably 5 to 50 parts by weight, per 100 parts by weight of the component (a). The use of component (b) less than 3 parts by weight is not preferred because the effect on weight reduction is small, whereas the use of more than 80 parts by weight of component (b) will considerably increase the breakage rate thereof.

Other Additional Components

In most cases, coloring pigments are incorporated in the resin compositions according to the present invention. Besides, in order to improve the performance thereof, various additives such as antioxidants, antistatic agents, flame retardants and dispersants may be added. Moreover, various fillers, elastomers and resins may be added to the compositions as additional ingredients other than the components (a) and (b) mentioned above.

In particular, unmodified or modified elastomers, nucleating agents and fillers as described later are preferably used.

Unmodified or Modified Elastomers

The unmodified or modified elastomers suitably used in the invention may include ethylene elastomers such as binary ethylene-propylene copolymer rubber (EPM), ethylene-propylene-non-conjugated diene terpolymer rubber (EPDM), binary ethylene-butene-1 copolymer rubber and ethylene-propylene-butene-1 terpolymer rubber; and styrene elastomers such as hydrogenated styrene-butadiene block copolymers expressed as styrene-ethylene-butylene-styrene block copolymers and hydrogenated styrene-isoprene block copolymers expressed as styrene-ethylene-propylene-styrene block copolymers; or products obtained by modifying at least a part of such elastomers with unsaturated organic acids such as acrylic acid and maleic anhydride or their derivatives.

These elastomers should preferably have a crystallinity of 30% or less. No critical limitation is placed on how to produce these or on what forms these are in. The content of each component in the elastomers may be determined by ordinary methods such as infrared photospectrometry or NMR.

In order to modify these elastomers with unsaturated organic acids or their derivatives, an unsaturated organic acid such as acrylic, methacrylic, maleic or itaconic acid; an unsaturated organic acid anhydride such as anhydrous maleic, itaconic or citraconic acid; an ester of an unsaturated organic acid such as methyl acrylate or monomethyl maleate; an amide of an unsaturated organic acid such as acrylamide or fumaric acid monoamide; or an imide of an unsaturated organic acid such as itaconic acid imide may be added to the elastomers in an amount of 0.01 to 20 parts by weight per 100 parts by weight of the elastomer under graft reaction conditions.

Among others, the elastomer is preferably modified with acrylic acid or maleic anhydride. For the modification, organic peroxides such as benzoyl peroxide and dicumyl peroxide are used so as to promote the degree of modification. The modification of elastomer may be achieved, for example, by kneading the elastomer with the above unsaturated compound in their molten state or by allowing the elastomer to react with the modifier in a solution.

Among the above mentioned elastomers, binary ethylene-propylene copolymer rubber (EPM), ethylene-propylene-non-conjugated diene terpolymer rubber (EPDM) and binary ethylene-butene-1 copolymer rubber (EBM), especially those having a propylene content of 20 to 55% by weight (EPM or EPDM) or a butene-1 content of 15 to 30% by weight (EBM) and having a Mooney viscosity ($ML_{1+4}$ at 100° C.) of less than 90, are preferred.

Such EPM, EPDM and EBM are most preferably modified with maleic anhydride.

In view of the balance among impact resistance, heat-resistance and rigidity of the resulting composition, the elastomer is used for the production of the composition in an amount of 2 to 100 parts by weight, preferably 5 to 60 parts by weight, more preferably 5 to 40 parts by weight, per 100 parts by weight of the propylene polymer.

Nucleating Agents

The nucleating agents, which are preferably used according to the present invention, may be metal salts of aromatic phosphoric acids, metal salts of aromatic carboxylic acids and sorbitols. Specific examples include sodium bis(4-t-butylphenyl)phosphate, sodium-2,2'-methylene-bis-(4,6-di-t-butyl-phenyl)phosphate, lithium-2,2'-methylene-bis-(4,6-di-t-butylphenyl)phosphate, aluminum-mono-hydroxy-di-p-t-butyl benzoate, sodium benzoate, 1,3,2,4-di-benzylidenesorbitol, 1,3,2,4-di-(p-methyl-benzylidene)sorbitol, 1,3,2,4-di-(p-ethyl-benzylidene)sorbitol, 1,3,2,4 di-(2',4'-di-methyl-benzylidene)sorbitol, 1,3-p-chlorobenzylidene-2,4-p-methyl-benzylidene-sorbitol and 1,3,2,4-di-(p-propylbenzylidene)sorbitol. Among these, disodium bis(4-t-butylphenyl)phosphate, sodium-2,2'-methylene-bis-(4,6-di-t-butyl-phenyl)phosphate, lithium-2,2'-methylene-bis-(4,6-di-t-butylphenyl)phosphate, aluminum-mono-hydroxy-di-p-t-butyl benzoate and sodium benzoate are preferred. Most preferred are sodium-2,2'-methylene-bis-(4,6-di-t-butyl-phenyl)phosphate and lithium-2,2'-methylene-bis-(4,6-di-t-butylphenyl)phosphate.

These nucleating agents are effective for further improving the rigidity and heat resistance of the light-weight molded product of the invention.

Other Fillers

In the present invention, other fillers than the above mentioned filler as component (b) may be used. Examples of such other fillers include talc having a mean particle diameter of 0.8 to 15.0 $\mu m$, mica having a mean particle diameter of 3 to 15 $\mu m$, glass fibers having a mean diameter of 18 $\mu m$ or less and whiskers having a mean diameter of 2 $\mu m$ or less and having a mean aspect ratio of 5 or more. It is preferred to use talc having a mean particle diameter of 0.8 to 5.0 $\mu m$, glass fibers having a mean diameter of 14 $\mu m$ or less, and basic magnesium sulfate whiskers (magnesium oxysulfate whiskers—$MgSO_4 \cdot 5Mg(OH)_2 \cdot 3H_2O$), calcium carbonate whiskers and carbon fibers, each having a mean diameter of 1 $\mu m$ or less and a mean aspect ratio of 5 or more. Most preferably used are talc having a mean particle diameter of 1.0 to 4.0 $\mu m$ and glass fibers having a mean diameter of 11 $\mu m$ or less. These fillers may be treated on their surfaces with surfactants, coupling agents, etc. The above mentioned other fillers are effective for further improving the rigidity, heat resistance, impact strength, dimensional stability and appearance of the light-weight molded products of the invention.

(2) Kneading

The above mentioned components are blended and kneaded to form a resin composition. Kneading may be carried out with the use of conventional kneading equipments such as a single- or twin-screw extruder, a Bunbary mixer, rolls, a Brabender Plastograph and a kneader.

Upon kneading, in what order kneading takes place is important for the invention.

Thus, it is required that at least a part of the component (a), preferably at least 40% by weight of the total amount of component (a), be first melted and kneaded, and the component (b) or the component (b) and the remainder of the component (a) be then separately or simultaneously added to the resultant melt for kneading.

More illustratively, a twin-screw extruder, for instance, is used and the whole or a part of the component (a) is fed in the front half of the extruder, where it is fully heated and kneaded. Then, the component (b) or the component (b) and the remainder of the component (a) are separately or concurrently fed in the rear half of the extruder for kneading. Thus, it is necessary that the component (b) be fed for kneading after the component (a) or a part thereof has been fully heated, melted and kneaded. Unless the components are mixed and kneaded in this manner, there will occur considerable breakage or destruction of component (b), whereby the advantages of the present invention are not obtained.

When the above mentioned unmodified or modified elastomer is used as component (c), it is required that at least a part of the components (a) and/or (c), preferably at least 50% by weight of the total amount of components (a) and (c), be melted and kneaded, and the component (b) or the component (b) and the remainder of the components (a) and/or (c) be thereafter separately or concurrently blended with the resultant melt for kneading.

(3) Propylene Resin Composition

The thus obtained propylene resin compositions contain the hollow filler of which a substantial portion (80% or more, preferably 90 to 100%) remains not broken. Of the compositions, those having a melt flow rate (MFR, measured at 230° C. under a 2.16-kg load) of 1 to 100 g/10 min, preferably 3 to 80 g/10 min are desirable in the light of processibility on later molding process.

Too low an MFR is not preferred, because not only is moldability bad, but the breakage rate of the hollow filler increases unacceptably as well. Too high an MFR is again not preferred, because the strength of molded products is low.

[II] Production of Molded Products

The propylene resin compositions are subjected to molding process to produce molded products.

For this purpose, any known molding technique such as injection compression molding (press injection, TPM, KPM and SPM), blow molding, injection molding, extrusion molding, sheet forming, vacuum forming, film forming and rotational molding may be employed.

Of these techniques, injection compression molding, blow molding, injection molding and compression molding are preferred. Particularly preferred are injection compression molding and injection molding, and injection compression molding is most preferred.

Upon molding or forming, close care should preferably be taken of molding or forming conditions and mold designs. In particular, the molding or forming pressure should preferably be as low as possible or, in more illustrative parlance, 1,000 kg/cm$^2$ or lower, preferably 500 kg/cm$^2$ or lower, more preferably 200 kg/cm$^2$ or lower. Otherwise, there is a likelihood that the breakage rate of the component (b) in the molded products will exceed 30%.

The following examples are presented to illustrate the process of the present invention, and are presented by way of illustration and are not to be construed as limiting the scope of the present invention.

Examples 1–5 and Comparative Examples 1–5

The starting materials and the measuring methods of physical properties used herein are as follows.

(1) Starting Materials

Component (a)

a-1: a propylene-ethylene block copolymer containing a propylene homopolymer moiety of a density of 0.9082 g/cm$^3$ and 12% by weight of a random copolymer moiety and having an overall MFR of 30 g/10 min.

a-2: the propylene-ethylene block copolymer a-1 modified with maleic anhydride (at a modifier concentration of 0.022% by weight).

a-3: a propylene homopolymer having a density of 0.9021 g/cm$^3$ and an MFR of 10 g/10 min.

Component (b)

b-1: glass balloons having a mean particle density (true density) of 0.5 g/cm$^3$, a mean diameter of 35 μm and a 10%-by-weight breakage pressure resistance of 520 kg/cm$^2$.

b-2: glass balloons having a mean particle density (true density) of 0.3 g/cm$^3$, a mean diameter of 60 μm and a 10%-by-weight breakage pressure resistance of 250 kg/cm$^2$.

b-3: ceramic balloons having a mean particle density (true density) of 0.7 g/cm$^3$, a mean diameter of 45 μm and a 10%-by-weight breakage pressure resistance of 110 kg/cm$^2$.

b-4: the glass balloons b-2 treated on their surfaces with an aminosilane (γ-aminopropyltrimethoxysilane).

b-5: glass balloons having a mean particle density (true density) of 0.15 g/cm$^3$ and a mean diameter of 65 μm and a 10%-by-weight breakage pressure resistance of 40 kg/cm$^2$.

Component (c)

c-1: glass fibers (treated on their surfaces with an aminosilane coupling agent) having a mean diameter of 10 μm and a length of 6 mm with surface binder deposition of 0.20% by weight.

c-2: a binary ethylene-propylene copolymer rubber (EPM) having a propylene content of 23% by weight and a Mooney viscosity (ML$_{1+4}$ at 100° C.) of 65.

c-3: talc having a mean particle diameter of 8 μm.

(2) Measurement

<MFR>

Measured at 230° C. and 2.16 kg according to JIS-K7210.

<Breakage Rate of Hollow Filler>

Calculated on the basis of the density of a test piece of molded product that was measured according to JIS-K7112.

<Flexural Modulus>

Measured on a test piece of mold product at 23° C. according to JIS-K7203.

<Dart Impact Strength>

Measured at 10° C. by dropping a 4-kg dart on a formed sheet (120☐×2 mmt) from a 2-m height.

(3) Procedure

The above components (a) (powder), (b) and (c) were blended and kneaded at the proportions shown in Table 1, together with tetrakis [methylene-3-(3′,5′-di-t-butyl-4′-hydroxyphenyl)propionate]methane and 2-2′-hydroxy-3′-t-butyl-5′-methylphenyl)-5-chlorobenzotriazole, each in an amount of 0.07 part by weight per 100 parts by weight of the total amount of (a)-(c), according to the following method (i) or (ii):

Method (i):

Component (a) (a-1 or a-2), component (c) (c-2) and the above additives were fully mixed in a high-speed mixer. The mixture was fed into the front half of a twin-screw extruder (manufactured by Nippon Steel Co., Ltd.), where the mixture was melted and fully kneaded at 220° C. Thereafter, component (b) and component (c) (c-1) were fed into the rear half of the extruder, and kneading of all of the components was conducted at 220° C.

Method (ii):

All of the components (a) (a-1 or a-3), (b) (b-2) and (c) (c-3) and the above additives were fully mixed in the same high-speed mixer. The mixture was fed into the front half of the same twin-screw extruder, and was melted and fully kneaded at 220° C.

From the thus obtained pellets, molded products were prepared at 220° C. by the following molding method (A) or (B).

Method (A):

Molding was conducted using a screw in-line type injection molding machine at a pressure of 450 kg/cm$^2$.

Method (B):

Molding was conducted using an injection compression molding machine at a pressure of 100 kg/cm$^2$.

For the molded products thus prepared, the physical properties were determined by the above described methods.

The results are shown in Table 1.

TABLE 1

| No. | (a) Crystalline Propylene Polymer Type | (a) Parts by weight | (b) Hollow Filler Type | (b) Parts by weight | (c) Other Component Type | (c) Parts by weight | Preparation Method Kneading | Preparation Method Molding | MFR (g/10 min.) | Breakage Rate (%) | (Density) (g/cm$^3$) | Flexural Modulus (kg/cm$^2$) | Dart Impact Strength (kg·cm) |
|---|---|---|---|---|---|---|---|---|---|---|---|---|---|
| Example 1 | a-1 | 100 | b-1 | 25 | — | — | (i) | A | 9 | 18 | (0.813) | 20,200 | 8 |
| Example 2 | a-1 | 100 | b-2 | 25 | — | — | (i) | B | 10 | 9 | (0.666) | 22,300 | 9 |
| Example 3 | a-1 | 100 | b-3 | 25 | — | — | (i) | B | 11 | 25 | (0.891) | 19,700 | 7 |
| Example 4 | a-1 | 100 | b-2 | 33 | c-1 c-2 | 17 17 | (i) | B | 8 | 11 | (0.892) | 25,800 | 18 |
| Example 5 | a-2 | 100 | b-4 | 25 | — | — | (i) | B | 8 | 7 | (0.660) | 23,200 | 12 |
| Comp. Example 1 | a-3 | 100 | — | — | — | — | — | A | 10 | — | (0.902) | 12,900 | 4 |
| Comp. Example 2 | a-3 | 100 | — | — | c-3 | 11 | (ii) | A | 9 | — | (0.966) | 21,700 | 5 |
| Comp. Example 3 | a-1 | 100 | b-2 | 25 | — | — | (ii) | A | 8 | 44 | (0.772) | 17,900 | 8 |
| Comp. Example 4 | a-1 | 100 | b-3 | 25 | — | — | (i) | A | 11 | 58 | (0.950) | 15,800 | 6 |
| Comp. Example 5 | a-1 | 100 | b-5 | 25 | — | — | (i) | B | 8 | 77 | (0.797) | 16,100 | 5 |

Examples 6–9

The starting materials used herein are as follows.

Component (a)

a-4: a propylene-ethylene block copolymer containing a propylene homopolymer moiety of a density of 0.9081 g/cm$^3$ and 15% by weight of a random copolymer moiety and having an overall MFR of 15 g/10 min, this copolymer being modified with maleic anhydride at a modifier concentration of 0.025% by weight.

Component (b)

b-6: glass balloons treated on their surfaces with 0.5% by weight of γ-aminopropyltrimethoxysilane, having a mean particle density (true density) of 0.55 g/cm$^3$, a mean diameter of 30 μm and a mean 10%-by-weight breakage pressure resistance of 540 kg/cm$^2$.

b-7: glass balloons treated on their surfaces with 0.5% by weight of γ-aminopropyltrimethoxysilane, having a mean particle density (true density) of 0.33 g/cm$^3$, a mean diameter of 55 μm and a mean 10%-by-weight breakage pressure resistance of 280 kg/cm$^2$.

Component (c)

c-4: a binary ethylene-propylene copolymer rubber (EPM) having an ethylene content of 75% by weight and a Mooney viscosity (ML$_{1+4}$ at 100° C.) of 20, modified with maleic anhydride at a modifier concentration of 1.2% by weight.

c-5: a binary ethylene-butene-1 copolymer rubber (EBM) having an ethylene content of 80% by weight and a Mooney viscosity (ML$_{1+4}$ at 100° C.) of 40, modified with maleic anhydride at a modifier concentration of 1.0% by weight.

c-6: a binary ethylene-propylene copolymer rubber (EPM) having an ethylene content of 73% by weight and a Mooney viscosity (ML$_{1+4}$ at 100° C.) of 40.

Procedure:

Component (a) and component (c), each in an amount as shown in Table 2, together with tetrakis[methylene-3-( 3',5'-di-t-butyl-4'-hydroxyphenyl)propionate]methane and 2-(2'-hydroxy-3'-t-butyl-5'-methylphenyl)-5-chlorobenzotriazole, each in an amount of 0.1% by weight, were fully mixed in a high-speed mixer. The resulting mixture was fed into the front half of the same twin-screw extruder as used in the preceding examples, where the mixture was melted and fully kneaded at 220° C. Thereafter, component (b) in an amount as shown in Table 2 was fed into the rear half of the extruder, and kneading of all of the components was conducted at 220° C.

From the thus obtained pellets, molded products were prepared at 220° C. by the above described method (A) or (B). For the molded products obtained, the physical properties were determined in the same manner as in the preceding examples except that the dart impact strength was herein measured by dropping a 4-kg dart on a formed sheet (120☐×3 mmt) from a 2-m height.

The results are shown in Table 2.

TABLE 2

| No. | (a) Crystalline Propylene Polymer Type | (a) Parts by weight | (b) Glass Balloon Type | (b) Parts by weight | (c) Elastomer Type | (c) Parts by weight | Molding Method | MFR (g/10 min.) | Breakage Rate (%) | (Density) (g/cm$^3$) | Flexural Modulus (kg/cm$^2$) | Dart Impact Strength (kg·cm) |
|---|---|---|---|---|---|---|---|---|---|---|---|---|
| Example 6 | a-4 | 100 | b-6 | 29 | c-4 | 14 | A | 3.5 | 15 | (0.823) | 17,300 | 39 |
| Example 7 | a-4 | 100 | b-7 | 29 | c-4 | 14 | B | 4.1 | 4 | (0.692) | 18,500 | 34 |
| Example 8 | a-4 | 100 | b-7 | 29 | c-5 | 14 | B | 3.1 | 5 | (0.694) | 18,900 | 32 |
| Example 9 | a-4 | 100 | b-7 | 29 | c-6 | 14 | B | 3.7 | 8 | (0.702) | 17,900 | 27 |

Example 10

The procedure of Example 7 was repeated except that sodium-2,2'-methylene-bis-(4,6-di-t-butylphenyl)-phosphate in an amount of 0.1 part by weight per 100 parts by weight of the total amount of components (a)-(c) was further fed into the high-speed mixer. The resulting molded product was found to have an MFR of 4.3 g/10 min, a breakage rate of the component (b) of 3% by weight (with a density of 0.689 g/cm$^3$), a flexural modulus of 20,900 kg/cm$^2$ and a dart impact strength of 31 kg·cm.

Example 11

The procedure of Example 8 was repeated except that silane-treated glass fibers of 9 μm in mean diameter in an amount of 21 parts by weight per 100 parts by weight of the component (a) was further fed into the high speed mixer. The resulting molded product was found to have an MFR of 2.7 g/10 min, a breakage rate of the component (b) of 6% by weight (with a density of 0.767 g/cm$^3$), a flexural modulus of 31,600 kg/cm$^2$ and a dart impact strength of 57 kg·cm.

What is claimed is:

1. A process for producing a molded product of propylene resin which comprises melting and kneading at least a part of the following component (a), adding to the resulting melt the following component (b) or the component (b) and the remainder of the component (a) and kneading the resulting mixture to prepare a resin composition having a melt flow rate of 1 to 100 g/10 min, and then molding the resin composition into a molded product in which the breakage rate of the component (b) is 30% by weight or less:
   (a) 100 parts by weight of a crystalline propylene polymer having a melt flow rate of 1 to 300 g/10 min, and
   (b) 3 to 80 parts by weight of a filler in the form of hollow particles having a mean particle density (true density) of 0.1 to 0.9 g/cm$^3$, as measured according to ASTM-D2840, a mean particle diameter of 7 to 100 μm and a 10%-by-weight breakage pressure resistance of 100 kg/cm$^2$ or more, as measured according to ASTM-D3102.

2. The process according to claim 1, wherein the crystalline propylene polymer is a propylene-ethylene block copolymer having a melt flow rate of 2 to 100 g/10 min.

3. The process according to claim 1, wherein the crystalline propylene polymer is a propylene-ethylene block copolymer containing a propylene homopolymer moiety of a density of 0.9070 g/cm$^3$ or more and 3 to 40% by weight of a random copolymer moiety.

4. The process according to claim 1, wherein the crystalline propylene polymer is at least partly modified with an unsaturated organic acid or its derivative.

5. The process according to claim 4, wherein the unsaturated organic acid is acrylic acid or its derivative or maleic anhydride.

6. The process according to claim 1, wherein the filler has a mean particle density (true density) of 0.2 to 0.7 g/cm$^3$, a mean diameter of 10 to 90 μm and a 10%-by-weight breakage pressure resistance of 120 kg/cm$^2$ or more.

7. The process according to claim 6, wherein the filler has a mean particle density (true density) of 0.2 to 0.6 g/cm$^3$, a mean diameter of 10 to 60 μm and a 10%-by-weight breakage pressure resistance of 150 kg/cm$^2$ or more.

8. The process according to claim 1, wherein the filler is coupling-treated glass balloons having a mean particle density (true density) of 0.1 to 0.8 g/cm$^3$, a mean diameter of 7 to 100 μm and a 10%-by-weight breakage pressure resistance of 150 kg/cm$^2$ or more.

9. The process according to claim 8, wherein said glass balloons have a mean particle density (true density) of 0.2 to 0.7 g/cm$^3$, a mean diameter of 10 to 90 μm and a 10%-by-weight breakage pressure resistance of 200 kg/cm$^2$ or more.

10. The process according to claim 1, wherein 5 to 70 parts by weight of the component (b) is used per 100 parts by weight of the component (a).

11. The process according to claim 10, wherein 5 to 50 parts by weight of the component (b) is used per 100 parts by weight of the component (a).

12. The process according to claim 1, wherein the resin composition has a melt flow rate of 3 to 80 g/10 min.

13. The process according to claim 1, wherein the molding is conducted by injection molding.

14. A process for producing a molded product of propylene resin, which comprises melting and kneading at least a part of the following components (a) and/or (c), adding to the resulting melt the following component (b) or the component (b) and the remainder of the components (a) and/or (c) and kneading the resulting mixture to prepare a resin composition having a melt flow rate of 1 to 100 g/10 min, and then molding the resin composition into a molded product in which the breakage rate of the component (b) is 30% by weight or less:
   (a) 100 parts by weight of a crystalline propylene polymer at least partly modified with an unsaturated organic acid or its derivative, containing a propylene homopolymer moiety of a density of 0.9070 g/cm$^3$ or more and having an overall melt flow rate of 1 to 300 g/10 min,
   (b) 3 to 100 parts by weight of coupling-treated glass balloons having a mean particle density (true density) of 0.1 to 0.8 g/cm$^3$, as measured according to ASTM-D2840, a mean particle diameter of 7 to 100 μm and a 10%-by-weight breakage pressure resistance of 150 kg/cm$^2$ or more, as measured according to ASTM-D3102, and
   (c) 2 to 100 parts by weight of an elastomer either unmodified or at least partly modified with an unsaturated organic acid or its derivative.

15. The process according to claim 14, wherein the elastomer is based on ethylene or styrene.

16. The process according to claim 14, wherein the unsaturated organic acid or its derivative is acrylic acid or maleic anhydride.

17. The process according to claim 14, wherein the glass balloons have a mean particle density (true density) of 0.2 to 0.7 g/cm$^3$, a mean diameter of 10 to 90 μm and a 10%-by-weight breakage pressure resistance of 200 kg/cm$^2$ or more.

* * * * *